US011338845B2

(12) United States Patent
Zientek et al.

(10) Patent No.: US 11,338,845 B2
(45) Date of Patent: May 24, 2022

(54) METHOD FOR OPERATING AN ELECTRICAL POWER STEERING SYSTEM OF A TRANSPORTATION VEHICLE AND ELECTRICAL POWER STEERING SYSTEM (71) Applicants: VOLKSWAGEN AG, Wolfsburg (DE); ROBERT BOSCH GMBH, Stuttgart (DE)

(72) Inventors: Jens Zientek, Sommersdorf OT Marienborn (DE); Marcel Gross, Schwäbisch Gmünd (DE)

(73) Assignee: Volkswagen AG ( * ) Notice: Subject to any disclaimer, the term of this patent is extended or adjusted under 35 U.S.C. 154(b) by 693 days.

(21) Appl. No.: 16/325,801

(22) PCT Filed: Aug. 17, 2017

(86) PCT No.: PCT/EP2017/070844
§ 371 (c)(1),
(2) Date: Feb. 15, 2019

(87) PCT Pub. No.: WO2018/033597
PCT Pub. Date: Feb. 22, 2018

(65) Prior Publication Data
US 2021/0331736 A1 Oct. 28, 2021

(30) Foreign Application Priority Data
Aug. 18, 2016 (DE) .................... 10 2016 215 506.7

(51) Int. Cl.
B62D 5/04 (2006.01)
B62D 15/02 (2006.01)
(52) U.S. Cl.
CPC ......... B62D 5/0463 (2013.01); B62D 5/0472 (2013.01); B62D 15/0215 (2013.01)

(58) Field of Classification Search
CPC . B62D 5/0463; B62D 5/0472; B62D 15/0215
(Continued)

(56) References Cited

U.S. PATENT DOCUMENTS 4,753,308 A * 6/1988 Noto .................... B62D 5/0463
180/446
8,082,079 B2 * 12/2011 Nakai .................... B62D 5/046
701/41
(Continued)

FOREIGN PATENT DOCUMENTS

CN 102574540 A 7/2012
CN 104859711 A 8/2015
(Continued)

OTHER PUBLICATIONS

Search Report for International Patent Application No. PCT/EP2017/070844; dated Dec. 1, 2017.

*Primary Examiner* — Isaac G Smith
(74) *Attorney, Agent, or Firm* — Barnes & Thornburg, LLP (57) ABSTRACT A method for operating an electrical power steering system of a transportation vehicle wherein a steering wheel angle is pre-defined by a steering wheel as a measure for a desired wheel steering angle for at least one steerable wheel of the transportation vehicle, where an electrical power drive with an electric motor provides a steering support, and where a support torque of the steering support is reduced based on a damping function in response to the combustion engine of the transportation vehicle being started. Also disclosed is an associated electrical power steering system, to a computer program, and to a control appliance.

14 Claims, 4 Drawing Sheets (58) Field of Classification Search
USPC .......................................................... 701/41
See application file for complete search history.

(56) References Cited

U.S. PATENT DOCUMENTS

| | | | | |
|---|---|---|---|---|
| 8,473,161 B2* | 6/2013 | Izutani | ................. | B62D 5/0484 |
| | | | | 701/43 |
| 9,205,862 B2 | 12/2015 | Kameda | | |
| 9,533,702 B2* | 1/2017 | Miura | ................. | B62D 5/0484 |
| 9,828,022 B2* | 11/2017 | Pyo | ...................... | B62D 5/0463 |
| 2007/0100524 A1* | 5/2007 | Sakaguchi | ........... | B62D 5/0466 |
| | | | | 701/41 |
| 2012/0191301 A1 | 7/2012 | Benyo et al. | | |

FOREIGN PATENT DOCUMENTS

| | | |
|---|---|---|
| DE | 10050377 A1 | 4/2001 |
| DE | 102007002292 A1 | 7/2008 |
| DE | 102011015696 A1 | 10/2012 |
| DE | 102012107595 A1 | 2/2014 |
| DE | 102016200072 A1 | 7/2016 |
| EP | 2127997 A2 | 12/2009 |
| EP | 2821318 A2 | 1/2015 |
| EP | 2918478 A1 | 9/2015 |
| JP | 2015199402 A | 11/2015 |
| JP | 2016128310 A | 7/2016 |
| WO | 2016005669 A1 | 1/2016 |

* cited by examiner

METHOD FOR OPERATING AN ELECTRICAL POWER STEERING SYSTEM OF A TRANSPORTATION VEHICLE AND ELECTRICAL POWER STEERING SYSTEM

PRIORITY CLAIM

This patent application is a U.S. National Phase of International Patent Application No. PCT/EP2017/070844, filed 17 Aug. 2017, which claims priority to German Patent Application No. 10 2016 215 506.7, filed 18 Aug. 2016, the disclosures of which are incorporated herein by reference in their entireties.

SUMMARY

Illustrative embodiments relate to a method for operating an electric power steering system of a transportation vehicle, to an electric power steering system, to a computer program, and to a control unit of a power steering system.

BRIEF DESCRIPTION OF THE DRAWINGS

In the following, the disclosed embodiments will be described in greater detail with reference to the figures, in which.

DETAILED DESCRIPTION

Virtually all modern transportation vehicles are equipped with an electric power steering system which assists the driver of the transportation vehicle during steering by use of steering assistance.

DE 10 2012 107 595 B4 has disclosed a method for determining a setpoint standard value for the motor torque which is to be output by an electric servomotor in a power steering system for a transportation vehicle, a basic measurement value being determined in a manner which is dependent on a transportation vehicle speed and a manual torque, a stable measurement value with a limited increase being determined in a manner which is dependent on the basic measurement value and the manual torque, a slow measurement value being determined in a manner which is dependent on a differential value between the basic measurement value and the stable measurement value, and the stable measurement value and a slow measurement value being used to form the setpoint standard value for the servomotor.

DE 10 2007 002 292 A1 has disclosed a method for operating an electronic power steering system of a transportation vehicle, in the case of which method a steering wheel angle is predefined by a steering handle as a measure of a desired wheel steering angle for at least one steerable wheel of the transportation vehicle, and in the case of which method an electric servo drive with an electric motor provides steering assistance via a gear mechanism. A damping torque which is dependent on the steering angle and the actual rotational speed of the electric motor of the electric servo drive is loaded onto the electric motor over the at least approximately entire steering angle range.

Furthermore, to achieve fuel and $CO_2$ savings, automatic start-stop functions are implemented in the case of modern transportation vehicles, which automatic start-stop functions automatically switch off the internal combustion engine of the transportation vehicle when it reaches a standstill and during a stop phase, the electric power steering system is to continue to provide steering assistance here. In the case of starting of the internal combustion engine, dips of the supply voltage of the on-board electric system of the transportation vehicle occur on account of a high power consumption. The electric power steering system has to supply steering assistance even for this time period and has to exhibit haptically unobtrusive behavior for the driver during steering operations.

The disclosed embodiments are based on the technical problem of providing a method for operating an electric power steering system of a transportation vehicle, an electric power steering system for a transportation vehicle, a computer program and a control unit of a power steering system, in the case of which steering assistance can be provided more reliably.

Disclosed embodiments provide a method, an electric power steering system, a computer program, and a control unit for a power steering system.

A method for operating an electric power steering system of a transportation vehicle is provided, in the case of which method a steering wheel angle is predefined by a steering handle as a measure of a desired wheel steering angle for at least one steerable wheel of the transportation vehicle, an electric servo drive with an electric motor providing steering assistance, and an assistance torque of the steering assistance being reduced in a manner which is dependent on a damping function as long as starting of an internal combustion engine of the transportation vehicle is being carried out.

Furthermore, an electric power steering system for a transportation vehicle is provided, comprising a steering handle for predefining a steering wheel angle as a measure of a desired wheel steering angle for at least one steerable wheel of the transportation vehicle, an electric servo drive with an electric motor for providing steering assistance, and an electronic control unit for the electric servo drive, the electronic control unit being configured so as to reduce an assistance torque of the steering assistance in a manner which is dependent on a damping function as long as starting of an internal combustion engine of the transportation vehicle is being carried out.

Furthermore, a computer program with program code methods or mechanism is provided, to carry out the described method when the program is executed on a microprocessor of a computer, in particular, on a control unit of an electric power steering system.

At the same time, a control unit of an electric power steering system is provided, set up for carrying out the described method or for executing a computer program of the abovementioned type.

It is the core concept of the disclosure to always reduce a provided assistance torque of a steering assistance when the combustion engine of the transportation vehicle is being started. A reduction of this type can be understood as a damping torque. A reduction of this type is to be carried out when internal combustion engine starting is detected within the context of the automatic start-stop function. To this end, the assistance torque is reduced in a manner which is dependent on a damping function from the beginning of the internal combustion engine starting. The reduction of the assistance torque has the benefit that the supply voltage of the on-board electric system does not drop further.

Electronic power steering systems operate with an electric motor which is usually configured as a permanently excited synchronous machine which is actuated via a field-oriented control operation. If, due to a drop in the supply voltage during starting of the internal combustion engine of the transportation vehicle and a simultaneous steering movement with a high steering wheel angle speed, the steering system operates in field weakening mode, a high d current is recorded in addition to the current of the q component.

Within the context of the described method, it is then possible to reduce not only the current of the q component, but rather also the d component of the steering current, by high steering speeds being avoided in a manner which is dependent on detected starting of the internal combustion engine and a low supply voltage via a reduction of the steering assistance which can be understood to be an additional steering damping action which can be applied.

During the starting of the internal combustion engine, high rotational speeds of the electric motor and therefore field weakening currents of the d component are to be reduced via a gently starting reduction of the steering assistance (corresponds to a damping function). In the case of a very high effort by the driver, that is to say in the case of a great manual torque on the steering handle, high rotational speeds of the electric motor can nevertheless be achieved. Here, however, feeding of current back into the on-board electric system of the transportation vehicle even occurs, with the result that the supply voltage does not drop further.

This leads to the driver of the transportation vehicle not perceiving any restriction of the steering sensation in the relevant case of a small steering wheel angular velocity, even in the case of a low supply voltage as a result of the starting of the internal combustion engine.

It is provided that the reduction of the provided steering assistance is to be active from the time, from which starting of the internal combustion engine of the transportation vehicle is announced. An announcement of this type can be, for example, a corresponding control signal which is provided by a controller of the transportation vehicle. If the starting of the internal combustion engine has been concluded successfully, the reduction of the provided steering assistance is canceled again.

It is provided in at least one disclosed embodiment that a value of the assistance torque is set in a manner which is dependent on at least one state variable of the power steering system and/or the transportation vehicle. Here, a state variable is a measured value or a control parameter which at least partially depicts a current state of the power steering system and/or the transportation vehicle. This makes a flexible selection of one or more input parameters which can be used to control the reduction possible.

It is provided in a further disclosed embodiment that the at least one state variable is a rotor speed and/or a rotational speed of the electric motor, the reduction of the assistance torque being greater, the greater the rotor speed and/or the rotational speed. The rotor speed and/or the rotational speed of the electric motor can be detected, for example, via a sensor system which is arranged correspondingly on the electric motor, or can be determined or estimated on the basis of a signal which is provided by a controller of the servo drive.

It is provided in a further disclosed embodiment that the at least one state variable is a supply voltage of the power steering system or an on-board electric system of the transportation vehicle, the reduction of the assistance torque being greater, the lower the supply voltage. The supply voltage can either be detected directly at the electric power steering system and converted into a measured value, or else can be provided as a measured value by an on-board electronics system of the transportation vehicle, for example, via a communication bus (Controller Area Network, CAN, etc.). By the supply voltage being used directly as an input parameter for controlling the reduction of the assistance torque, a drop in the supply voltage can be reacted to directly, in particular, even with consideration of the level of the drop of the supply voltage.

It is provided in at least one disclosed embodiment that a starting rotational speed of the electric motor is set in a manner which is dependent on the steering wheel angle and/or a supply voltage of the power steering system or an on-board electric system of the transportation vehicle. This makes it possible for a reduction in the provided steering assistance to already be performed from the beginning of a steering operation. A gently starting reduction of the steering assistance can also be realized in this way. Furthermore, the steering wheel angle can be taken into consideration, since steering assistance in the case of small steering wheel angles can be of different magnitude than in the case of relatively great steering wheel angles.

It can be provided in at least one disclosed embodiment that the starting rotational speed of the electric motor is lower, the greater the steering wheel angle and/or the lower the supply voltage of the power steering system or the on-board electric system of the transportation vehicle. A haptically natural steering sensation can be produced in this way.

It is provided in a further disclosed embodiment that, after the starting of the internal combustion engine, a continuous transfer into the normal state takes place by way of a continuous decrease of the reduction of the assistance torque. This allows the normal steering sensation which is experienced by the driver to be re-established carefully. The driver ideally therefore does not notice the reduction in the steering assistance, or notices it merely to a very small extent.

It can be provided in a further disclosed embodiment that the continuous decrease of the reduction of the assistance torque takes place without jumps. Here, "without jumps" is to mean that the transition takes place in such a way that an associated function is continuously differentiable.

Furthermore, it can be provided that the continuous decrease of the reduction of the assistance torque takes place with a predefined gradient or change rate. A gentle transfer into the normal state is made possible as a result.

It is provided in a further disclosed embodiment that the reduction of the assistance torque is not yet decreased for a predefined minimum time after successful and concluded starting of the internal combustion engine of the transportation vehicle, but rather that the assistance torque still remains reduced. This has the benefit that the supply voltage of the on-board electric system of the transportation vehicle can stabilize before an increased power consumption by way of the power steering system occurs again. A predefined minimum time of this type can lie, for example, in the range from milliseconds to seconds.

It can be provided here that a value of the predefined minimum time is determined in a manner which is dependent on a minimum value of the supply voltage which has occurred during the starting of the internal combustion engine. As a result, a charging state of a battery and/or stability of the on-board electric system can be reacted to in a flexible way. For this purpose, the minimum value is detected, for example, by the control unit and is stored in a memory for later retrieval. The predefined minimum time is then selected in such a way that the minimum time is longer, the lower the minimum value of the supply voltage during the starting of the internal combustion engine and/or the more instable the on-board electric system. A fluctuation of the supply voltage of the on-board electric system over time can serve, for example, as a measure of an instability.

Figure 1:
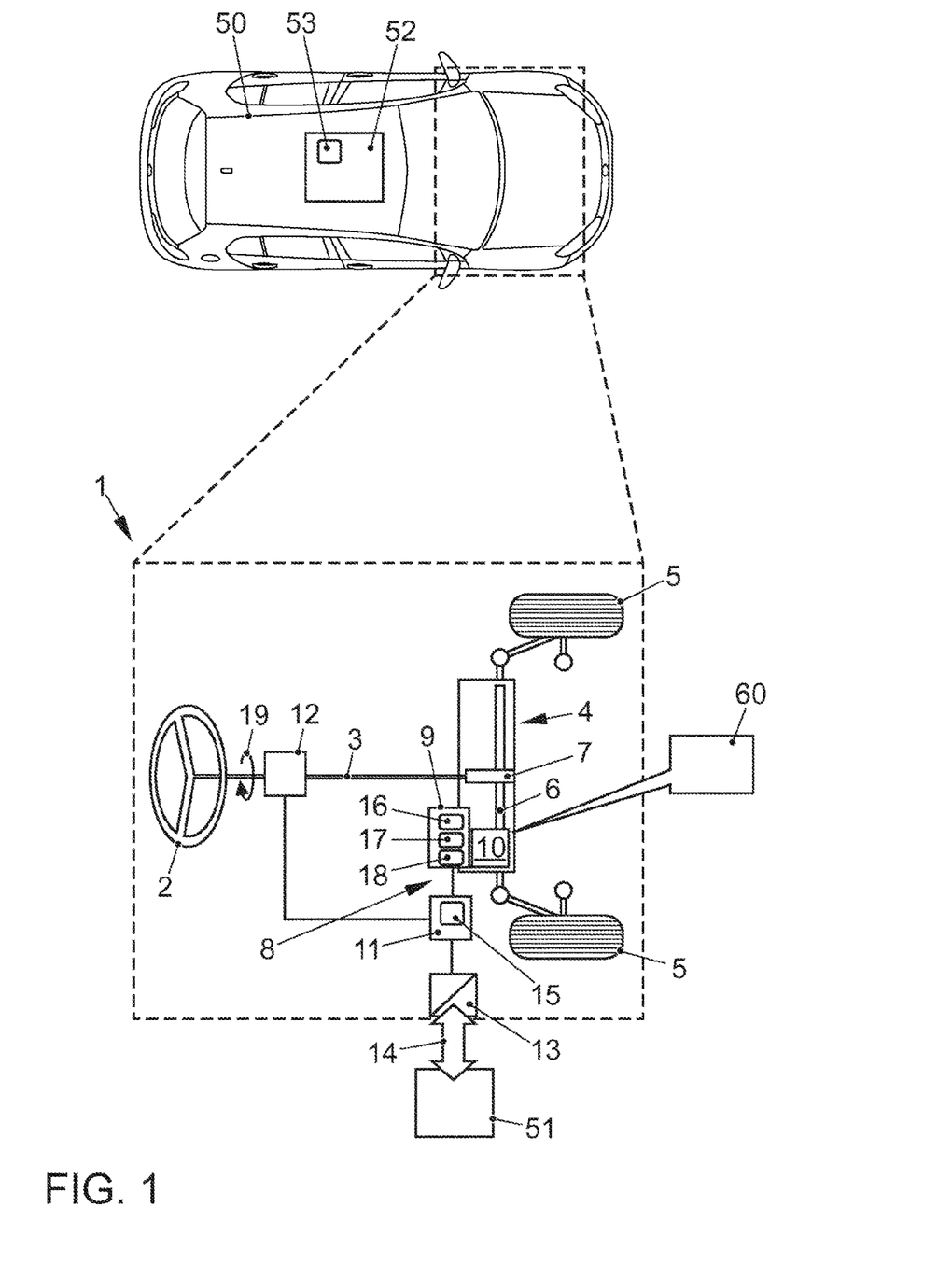
FIG. 1 shows a diagrammatic illustration of an embodiment of an electric power steering system of a transportation vehicle.

FIG. 1 shows a diagrammatic illustration of a disclosed embodiment of an electric power steering system 1 of a transportation vehicle 50. The electronic power steering system 1 has a steering handle 2 which is configured as a steering wheel. The steering handle 2 is connected to a steering gear 4 via a steering column 3. The steering gear 4 serves to convert a steering wheel angle 19 via the steering column 3 into a steering angle of steerable wheels 5 of the transportation vehicle 50. To this end, the steering gear 4 has a rack 6 and a pinion 7, on which the steering column 3 acts.

Moreover, the electric power steering system 1 has an electric servo drive 8 which serves for variable steering assistance by way of the provision of an additional assistance torque 60. The electric servo drive 6 has an electric motor 9 for realizing the steering assistance via a belt mechanism 10. The belt mechanism 10 has a drive pinion and a pulley wheel for transmitting the steering assistance via a recirculating ball mechanism (not shown in FIG. 1) to the rack 6 of the electric power steering system 1. Furthermore, an electronic control unit 11 for actuating and controlling the electric motor 9 is provided. The control unit 11 is connected via an interface 13 and a communication bus 14 (for example, CAN bus) of the transportation vehicle 50 to an on-board electronics system 51 of the transportation vehicle 50. The construction of the electric power steering system 1 is merely exemplary and can also be of different configuration.

If the interface 13 receives a report from the on-board electronics system 51 via the communication bus 14 of the transportation vehicle 50 that starting of an internal combustion engine of the transportation vehicle 50 is imminent, for example, by way of the reception of a corresponding start command via the communication bus 14, the interface 13 forwards the report to the control unit 11. The control unit 11 then reduces an assistance torque 60 of the steering assistance method or mechanism in a manner which is dependent on a damping function 15.

It can be provided here that the independent variables/variables of the damping function is/are configured in such a way that a value of the provided assistance torque 60 during the starting of the internal combustion engine is set in a manner which is dependent on at least one state variable of the electric power steering system 1 and/or the transportation vehicle 50.

It can be provided, for example, that the at least one state variable is a rotor speed 16 and/or a rotational speed 17 of the electric motor 9, the reduction of the assistance torque 60 being greater, the greater the rotor speed 16 and/or the rotational speed 17.

Furthermore, it can also be provided here in addition or as an alternative that the at least one state variable is a supply voltage 53 of the electric power steering system 1 or an on-board electric system 52 of the transportation vehicle 50, the reduction of the assistance torque 60 being greater, the lower the supply voltage 53. The value of the supply voltage 53 can be detected and determined, for example, via a corresponding sensor system directly at the electric power steering system 1, or can be requested and received via a report which contains a corresponding measured value, via the communication bus 14 and the interface 13, and can be evaluated by the control unit 11.

In addition or as an alternative, it can be provided that a starting rotational speed 18 of the electric motor 9 is set in a manner which is dependent on the steering wheel angle 19 and/or the supply voltage 53 of the electric power steering system 1 or the on-board electric system 52 of the transportation vehicle 50. The steering wheel angle 19 is detected, for example, on a sensor system 12 which is configured correspondingly for this purpose, for example, on a torsion bar, and is forwarded to the control unit 11.

It can be provided here that the starting rotational speed 53 of the electric motor 9 is set by the control unit 11 to be lower, the greater the steering wheel angle 19 and/or the lower the supply voltage 53 of the electric power steering system 1.

If the interface 13 subsequently receives a report that the starting of the internal combustion engine is concluded, the control unit 11 decreases the reduction of the assistance torque 60 continuously and in this way makes a continuous transfer into the normal state possible, in which the full steering assistance is again provided.

It can be provided here that the continuous decrease of the reduction of the assistance torque 60 takes place without jumps. Here, "without jumps" is to mean that the transition takes place in such a way that an associated function is continuously differentiable.

Furthermore, it can be provided that the continuous decrease of the reduction of the assistance torque 60 takes place with a predefined gradient or change rate. As a result, a gentle transfer into the normal state is made possible.

Furthermore, it can be provided that the reduction of the assistance torque 60 is not yet decreased for a predefined minimum time after successful and concluded starting of the internal combustion engine of the transportation vehicle 50, but rather that the assistance torque still remains reduced, to stabilize the on-board electric system 52 of the transportation vehicle 50 after the starting of the internal combustion engine. A predefined minimum time of this type can lie, for example, in the range of milliseconds to seconds.

It can additionally be provided here that a value of the predefined minimum time is determined in a manner which is dependent on a minimum value of the supply voltage 53 which has occurred during the starting of the internal combustion engine. As a result, a charging state of the battery and/or stability of the on-board electric system 52 can be reacted to in a flexible manner. The minimum value can be detected, for example, by the control unit 11 and can be stored in a memory for later retrieval. The predefined minimum time can be selected in such a way that the minimum time is longer, the lower the minimum value of the supply voltage 53 during the starting of the internal combustion engine and/or the more unstable the on-board electric system 52.

Figure 2:
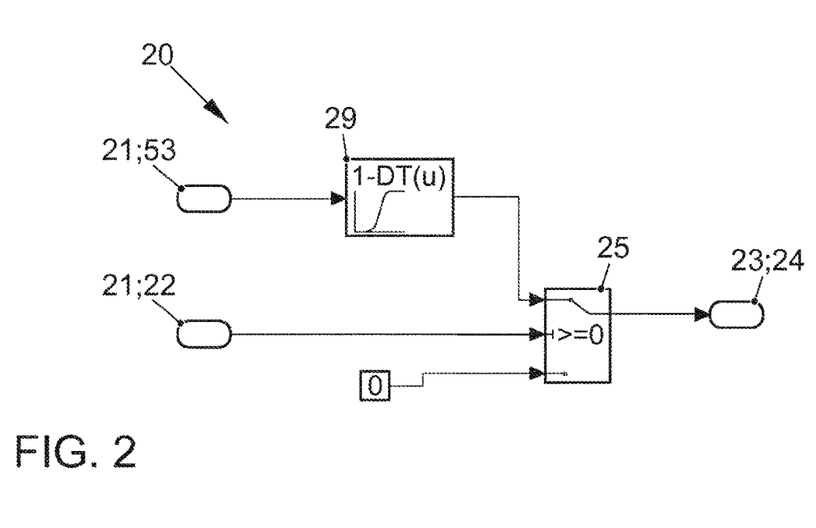
FIG. 2 shows a diagrammatic illustration of a signal flow diagram for controlling the reduction of a provided assistance torque for an embodiment.

FIG. 2 shows a diagrammatic illustration of a signal flow diagram 24 for controlling the reduction of the assistance torque which is provided by the electric motor for a simple disclosed embodiment.

Input signals 21 of the signal flow diagram 20 are a supply voltage 53 of the electric power steering system or the on-board electric system of the transportation vehicle, and a start-stop active signal 22 (also called a start-stop active flag) which indicates whether the starting of the internal combustion engine of the transportation vehicle is currently being carried out or not. The single output signal 23 is a damping torque 24 which corresponds to the level of the reduction of the assistance torque of the steering assistance method or mechanism, that is to say, the greater the damping torque 24, the greater the reduction of the assistance torque. Here, the signal flow diagram 20 is independent of the specific disclosed embodiment (that is to say, analog and/or digital) of the input signals 21 and the output signal 23, and serves merely to illustrate the method.

On the basis of the start-stop active signal 22, a decision is made in a decision block 25 as to whether a reduction of the steering assistance is to be performed at all or not. If the start-stop active signal 22 is not set, that is to say no starting of the internal combustion engine is currently being carried out, for example, because it is switched off or is already running, the damping torque 24 is equal to zero.

If, in contrast, the start-stop active signal 22 is set, that is to say starting of the internal combustion engine is currently being carried out, the damping torque 24 is calculated from the supply voltage 53 in a manner which is dependent on a characteristic 29 which represents the damping function. Here, the characteristic 29 which is shown in FIG. 2 is to be understood to be merely symbolic and can have another profile.

Further input signals 21 can also be provided which are taken into consideration during fixing of the damping torque 24. Merely a rotor speed and/or a rotational speed and/or a starting rotational speed of the electric motor and a steering wheel angle are/is to be mentioned by way of example.

Figure 3:
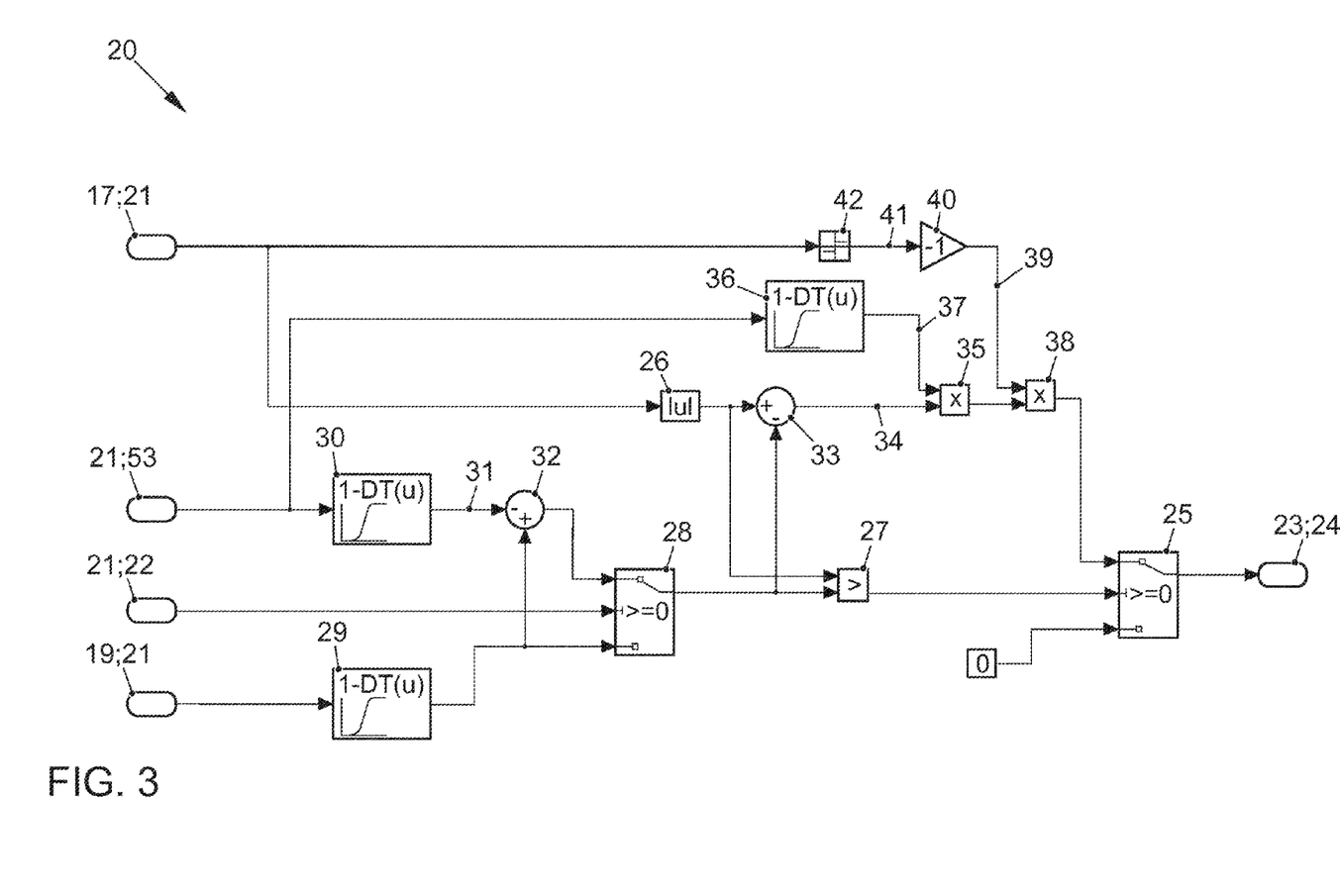
FIG. 3 shows a diagrammatic illustration of a signal flow diagram for controlling the reduction of a provided assistance torque for a further embodiment.

FIG. 3 shows a diagrammatic illustration of a signal flow diagram 20 for controlling the reduction of the assistance torque which is provided by the electric motor for a further disclosed embodiment.

Input signals 21 of the signal flow diagram 20 are a rotational speed 17 of the electric motor of the servo drive, a supply voltage 53 of the electric power steering system or the on-board electric system of the transportation vehicle, a start-stop active signal 22 (also called a start-stop active flag) which indicates whether starting of the internal combustion engine of the transportation vehicle is currently being carried out or not, and a steering wheel angle 19. The single output signal 23 is a damping torque 24 which corresponds to the level of the reduction of the assistance torque of the steering assistance method or mechanism. Here, the signal flow diagram 20 is independent of the specific disclosed embodiment (that is to say, analog and/or digital) of the input signals 21 and the output signal 23, and serves merely to illustrate the method.

On the basis of the rotational speed 17 of the electric motor, a decision is made in a decision block 25 as to whether a reduction of the steering assistance is to be performed at all or not. To this end, an absolute value of the rotational speed 17 is formed in an absolute value block 26, it being assumed that the rotational speed 17 has a different algebraic sign depending on the direction. The absolute value of the rotational speed 17 is compared in a comparator block 27 with a value for the starting rotational speed 18.

The value for the starting rotational speed 18 is determined as follows: a selection is made between two alternatives for determining the starting rotational speed 18 in a decision-maker block 28 in a manner which is dependent on the value for the start-stop active signal 22. If the start-stop active signal 22 is not set, that is to say there is currently no starting of the internal combustion engine of the transportation vehicle, a magnitude of the starting rotational speed 18 is determined on the basis of a characteristic 29 from the steering wheel angle 19. If, in contrast, the start-stop active signal 22 is active, a magnitude for an offset 31 of the starting rotational speed 18 is formed from the supply voltage 53 on the basis of a further characteristic 30, which offset 31 is subtracted in a node 32 from the starting rotational speed which is determined from the steering wheel angle 19 by the characteristic 29, and is provided at the output of the decision-maker block 28.

If the absolute value of the rotational speed 17 of the electric motor is lower than the starting rotational speed 18, a value "0" is output by the comparator block 27. If, in contrast, the absolute value of the rotational speed 17 of the electric motor is higher than the starting rotation speed 18, a value "1" is output by the comparator block 27. If the value is equal to "0", the damping torque 24 is set to be equal to zero by the decision-maker block 25. If, in contrast, the value is "1", a damping torque 24 which is not equal to zero is output.

If the damping torque 24 is not equal to zero, the value of the damping torque 24 is calculated as follows: in a further node 33, a system deviation 34 is determined from the magnitude of the rotational speed 17 of the electric motor and the determined starting rotational speed 18. The system deviation 34 is multiplied in a multiplication block 35 with a control gain 37 which is determined from the supply voltage 53 by a characteristic 36. Subsequently, the product is multiplied in a further multiplication block 38 with an algebraic sign factor 39 to fix an algebraic sign of the resulting damping torque 24, the algebraic sign factor 39 being determined from an algebraic sign 41 of the rotational speed 17 of the electric motor, which algebraic sign 41 is inverted in an inverting block 40. To this end, the algebraic sign 41 of the rotational speed 17 of the electric motor is determined in an algebraic sign determination block 42.

The characteristics 29, 30, 36 which are shown in FIG. 3 are to be understood to be merely symbolic, and can have other profiles.

Figure 4:
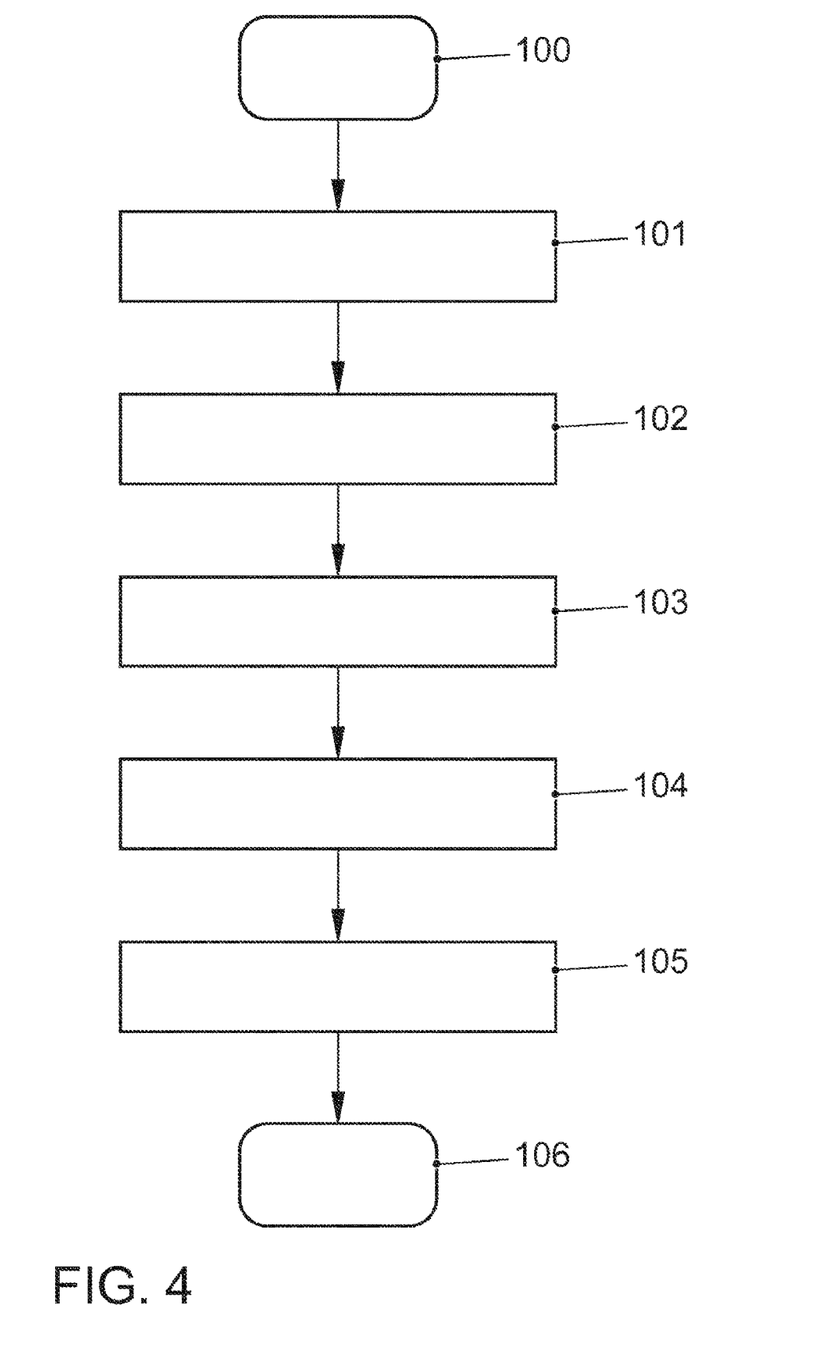
FIG. 4 shows a diagrammatic flow chart of an embodiment of the method for operating an electric power steering system of a transportation vehicle.

FIG. 4 shows a diagrammatic flow chart of at least one disclosed embodiment of the method for operating an electric power steering system of a transportation vehicle. After the start 100 of the method, an assistance torque for steering assistance is provided by way of the electric power steering system in a method operation at 101.

If it is detected in a method operation at 102 that starting of an internal combustion engine is being carried out, the assistance torque of the steering assistance is subsequently reduced in a manner which is dependent on a damping function in method operation at 103.

If it is subsequently detected in method operation at 104 that the starting of the internal combustion engine is concluded, the assistance torque of the steering assistance is increased again to the original value in method operation at 105. Subsequently, the method is ended 106.

LIST OF DESIGNATIONS

1 Electric power steering system
2 Steering handle
3 Steering column
4 Steering gear
5 Wheel
6 Rack
7 Pinion
8 Servo drive
9 Electric motor
10 Gear mechanism
11 Control unit 12 Sensor system
13 Interface
14 Communication bus
15 Damping function
16 Rotor speed
17 Rotational speed
18 Starting rotational speed
19 Steering wheel angle
20 Signal flow diagram
21 Input signal
22 Start-stop system active signal
23 Output signal
24 Damping torque
25 Decision maker block
26 Absolute value block
27 Comparator block
28 Decision maker block
29 Characteristic
30 Characteristic
31 Offset
32 Node
33 Node
34 System deviation
35 Multiplication block
36 Characteristic
37 Control gain
38 Multiplication block
39 Algebraic sign factor
40 Inverting block
41 Algebraic sign
42 Algebraic sign determination block
50 Transportation vehicle
51 Onboard electronics system
52 Onboard electric system
53 Supply voltage
60 Assistance torque

The invention claimed is:

1. A method for operating an electric power steering system of a transportation vehicle, the method comprising:
setting a value of a steering wheel angle of a steering wheel based on a desired steering angle of at least one steerable wheel of the transportation vehicle;
setting a value of assistance torque based on at least one state variable of the electric power steering system and/or the transportation vehicle, wherein the at least one state variable is a rotor speed and/or a rotational speed of an electric motor; and
providing steering assistance via a command signal from an electric servo drive to the electric motor,
wherein an assistance torque of the steering assistance is reduced based on a damping function in response to starting of an internal combustion engine of the transportation vehicle, wherein the reduction of the assistance torque increases with an increase in the rotor speed and/or the rotational speed.

2. The method of claim 1, wherein the at least one state variable is a supply voltage of the power steering system or an on-board electric system of the transportation vehicle, the reduction of the assistance torque being greater, the lower the supply voltage.

3. The method of claim 1, wherein a starting rotational speed of the electric motor is set based on the steering wheel angle and/or a supply voltage of the power steering system or an on-board electric system of the transportation vehicle.

4. The method of claim 3, wherein the starting rotational speed of the electric motor is lower, the greater the steering wheel angle and/or the lower the supply voltage of the power steering system or the on-board electric system of the transportation vehicle.

5. The method of claim 1, wherein a continuous transfer into the normal state takes place by a continuous decrease of the reduction of the assistance torque after the starting of the internal combustion engine.

6. An electric power steering system for a transportation vehicle, the system comprising:
a steering wheel configured to determine a steering wheel angle based on a desired steering angle of at least one steerable wheel of the transportation vehicle;
an electric servo drive electrically coupled to an electric motor configured to provide steering assistance; and
an electronic control unit for controlling operation of the electric motor via the electric servo drive, wherein the electronic control unit is configured to:
set a value of assistance torque based on at least one state variable of the electric power steering system and/or the transportation vehicle, wherein the at least one state variable is a rotor speed and/or a rotational speed of the electric motor,
reduce the assistance torque of the steering assistance based on a damping function in response to a starting of an internal combustion engine of the transportation vehicle, wherein the reduction of the assistance torque increases with an increase in the rotor speed and/or the rotational speed.

7. A computer readable medium including a computer program having program code to carry out a method for operating an electric power steering system of a transportation vehicle when the program is executed on a microprocessor of a computer, the method comprising:
setting a value of a steering wheel angle of a steering wheel based on a desired steering angle of at least one steerable wheel of the transportation vehicle;
setting a value of assistance torque based on at least one state variable of the electric power steering system and/or the transportation vehicle, wherein the at least one state variable is a rotor speed and/or a rotational speed of an electric motor; and
providing steering assistance via a command signal from an electric servo drive to the electric motor,
wherein an assistance torque of the steering assistance is reduced based on a damping function in response to starting of an internal combustion engine of the transportation vehicle, wherein the reduction of the assistance torque increases with an increase in the rotor speed and/or the rotational speed.

8. A control unit of an electric power steering system, for carrying out a method for operating an electric power steering system of a transportation vehicle that comprises:
setting a steering wheel angle of a steering wheel based on a desired steering angle for at least one steerable wheel of the transportation vehicle;
setting a value of assistance torque based on at least one state variable of the electric power steering system and/or the transportation vehicle, wherein the at least one state variable is a rotor speed and/or a rotational speed of an electric motor; and
providing steering assistance via a command signal from an electric servo drive to the electric motor,
wherein an assistance torque of the steering assistance is reduced based on a damping function in response to starting of an internal combustion engine of the transportation vehicle, wherein the reduction of the assistance torque increases with an increase in the rotor speed and/or the rotational speed.

9. The control unit of claim 8, wherein a value of the assistance torque is set based on at least one state variable of the power steering system and/or the transportation vehicle.

10. The control unit of claim 9, wherein the at least one state variable is a rotor speed and/or a rotational speed of the electric motor, the reduction of the assistance torque being greater, the greater the rotor speed and/or the rotational speed.

11. The control unit of claim 9, wherein the at least one state variable is a supply voltage of the power steering system or an on-board electric system of the transportation vehicle, the reduction of the assistance torque being greater, the lower the supply voltage.

12. The control unit of claim 9, wherein a starting rotational speed of the electric motor is set based on the steering wheel angle and/or a supply voltage of the power steering system or an on-board electric system of the transportation vehicle.

13. The control unit of claim 12, wherein the starting rotational speed of the electric motor is lower, the greater the steering wheel angle and/or the lower the supply voltage of the power steering system or the on-board electric system of the transportation vehicle.

14. The control unit of claim 9, wherein a continuous transfer into the normal state takes place by a continuous decrease of the reduction of the assistance torque after the starting of the internal combustion engine.

\* \* \* \* \*